Nov. 12, 1935.  M. KRONSCHNABL  2,020,688
PROCESS FOR THE PRODUCTION OF NEGATIVES OR POSITIVES PARTICULARLY
SEPARATION NEGATIVES FOR COLOR REPRODUCTION
Filed May 17, 1932
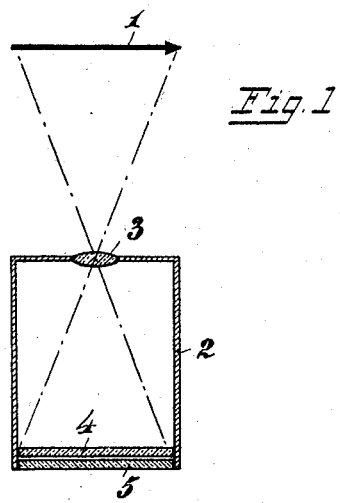
Fig. 1
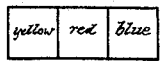
Fig. 2
Original
Fig. 3
1st Negative
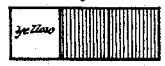
Fig. 4
2nd Negative
Fig. 5
3rd Negative
Fig. 6
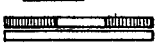
Fig. 7
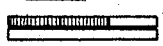
Fig. 8
Fig. 9
Fig. 11
Fig. 10
Fig. 12
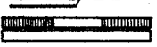
Fig. 13
Fig. 14
Michael Kronschnabl
INVENTOR
By
his ATTY.

Patented Nov. 12, 1935

2,020,688

UNITED STATES PATENT OFFICE 2,020,688

PROCESS FOR THE PRODUCTION OF NEGATIVES OR POSITIVES, PARTICULARLY SEPARATION NEGATIVES FOR COLOR REPRODUCTION

Michael Kronschnabl, Munich, Germany, assignor of part interest to August Boettger, Munich, Germany Application May 17, 1932, Serial No. 611,944
In Germany May 21, 1931

9 Claims. (Cl. 95—2)

The invention relates to a process for the production of negatives or positives in which the light-sensitive surface is pre-exposed in the photographic camera behind one or more masking negatives or positives, taken from the same originals, and after removal of the one or the other of the masking negatives or positives, is further exposed.

The invention is particularly suited to the production of separation negatives for color reproduction (relief, flat, intaglio, half-tone, offset, collotype, &c), and has the advantage, in comparison with existing processes, of securing the complete, or almost complete, elimination of all subsequent retouching.

Separation negatives for color reproduction are, as is well known, produced in a photographic way by means of panchromatic plates, i. e., plates sensitive to all colors of the spectrum, so as to obtain, for example, the yellow separation negative through exposure behind a blue filter, the red separation negative through exposure behind a green filter, and the blue separation negative through exposure behind an orange filter.

The separation negatives thus obtained from originals in oil, water-color, tempera, pastel, etc. are subject to color imperfections and they must be made color correct by means of considerable retouching.

These difficulties are obviated according to the invention by first exposing the panchromatic surface in two or more working stages, one after the other, behind different kinds of masking negatives, taken with correspondingly different colored rays (for instance, through color filters) and subsequently exposing with corresponding colored light of its own separation color.

Hereinafter is described the production of three of such masking negatives and the production of the separation negative for color reproduction on the basis of the usual colors employed in three-color printing.

It is presupposed that for the employment of the process a dark-slide, is used by means of which the plates are so fixed that in taking them out and putting them in again they are always placed in exact mathematical register.

For the production of the masking negatives slow panchromatic dry plates, such as are ordinarily used for line work, are used.

The 1st masking negative is taken through a green filter and the exposure time should not be too short, so that the yellow and blue appear covered as much as possible. The development follows in the usual way, and in order to hasten the drying it is convenient, after a short washing of the plate, to put it into a bath of permanganate of potash, then once more give it a short washing, and finally put it into methylated spirit, so as to dry it off quickly.

The production of the 2nd masking negative is split up into two working stages with a pre-exposure and after-exposure. The pre-exposure of the 2nd masking negative is made behind the 1st masking negative and through an orange filter with orange colored light. This pre-exposure has the purpose of cutting out the red. After completion of the pre-exposure the 1st masking negative is removed from the darkslide (in the dark room); the dark-slide is then put back into its original position in the camera and the exposure with blue light through a blue filter is then made. Development follows in the usual way.

The production of the 3rd masking negative is divided into three working stages:

First, the unexposed plate is placed behind the 1st masking negative, exposed through an orange filter with orange colored light. Then, after taking away the 1st masking negative from the dark slide and inserting the 2nd masking negative, it is once more exposed through the orange filter. Finally, after removal of the 2nd masking negative from the dark-slide, the further exposure with orange-colored light follows.

The pre-exposures in the production of masking negatives are not absolutely required.

The masking negatives thus obtained according to the purpose in view possess characteristics of the utmost importance for the color-correct production of the separation negatives.

In the 1st masking negative, as already mentioned, yellow and blue are more or less covered, according to whether they are soft, strong, or of even color tones like the originals, whereas the soft and strong red color tones are more or less transparent.

In the 2nd masking negative even the red is covered, which has hitherto not been possible, and similarly the blue as hitherto, whilst the yellow is uncovered.

In the 3rd masking negative blue appears very clear and transparent but red and yellow, on the other hand, are to the greatest extent covered.

The three masking negatives will be employed in suitably chosen ways in the exposure of the separate printing negatives as follow:

(a) *Production of the yellow separation printing negative*

The unexposed panchromatic plate is first exposed behind the 1st masking negative through an orange filter; then the 1st masking negative is changed for the 3rd masking negative and the exposure is continued through a blue filter. The after-exposure is made after removal of the 3rd masking negative, and again with blue light; then the usual development is carried out.

In the yellow negatives used hitherto the blue is covered only to an insufficient extent; red and yellow appear transparent. In order to make sure that these negatives have their proper color values, retouching for color is required; blue must, for instance, be given a stronger covering; red must generally be covered, because hitherto it has not been possible to obtain red covered in a yellow separation printing plate, and the covering of red has been obtained by transferring a tracing of the red separation printing negative on to the yellow.

These defects are not met with in the yellow separation printing negative produced in accordance with the invention, the delicate yellow tones being retained; on the other hand, the red and blue are completely cut out; the yellow separation printing negative corresponds, therefore, actually with the yellow value of the color originals.

(b) *The production of the red separation printing negative*

The unexposed panchromatic plate is exposed behind the 3rd masking negative through a blue filter under illumination by blue light. Then the 3rd masking negative is changed for the 2nd masking negative and the pre-exposure through a green filter with green light takes place. The further exposure follows after removal of the 2nd masking negative and with green light; then the plate is developed in the usual way.

The progressive differences of these separation printing negatives produced by the methods of the invention, in comparison with the hitherto usual ones, consist in the yellow and blue being substantially better covered and in the delicate red being more open, whereby the actual red coloring of the colored originals is obtained.

(c) *The production of the blue separation printing negative*

The unexposed panchromatic plate is exposed behind the 1st masking negative through an orange filter and with orange-colored light. Then the 1st masking negative is changed for the 2nd masking negative and the exposure proceeds with the same orange light. The further exposure follows after removal of the 2nd masking negative, also through the orange filter with orange light; development follows as usual.

A comparison with the hitherto usual blue separation printing negative shows that the yellow and red obtained by means of the invention are actually better covered and, therefore, these negatives correspond to the correct blue values of the originals.

By the methods of pre-exposure in accordance with the invention those colors which have to be cut out in each separation printing negative are completely covered.

The after-exposure has the object of securing the delicate color tones of the corresponding separation printing plate.

If the plates were exposed in the normal manner for a longer time, the deeper tones would certainly obtain a stronger covering, but it would injuriously affect the delicate tones. The process of the invention permits the preservation of the delicate tones, whilst eliminating the retouching hitherto necessary for the removal of the color tones that have to be cut out.

The following are examples of the times for development and exposure:

(I) *Production of the masking negatives with slow panchromatic plates of a sensitiveness 9—10 Scheiner*

1st masking negative: Green filter, exposure 15 minutes; development time 7 minutes.
2nd masking negative: Orange filter, pre-exposure 12 minutes; blue filter, after-exposure 10 minutes; development time 5 minutes.
3rd masking negative: Orange filter, pre-exposure 10 minutes; orange filter, further exposure of 6 minutes; orange filter, after-exposure 4 minutes; development time 5 minutes.

(II) *Production of separation printing negatives with panchromatic plates of higher sensitiveness of 21 Scheiner*

Yellow plate:
1st masking negative: Orange filter, pre-exposure 7 minutes.
3rd masking negative: Blue filter, pre-exposure 7 minutes, after-exposure 3½ minutes; development time 10 minutes.

Red plate:
3rd masking negative: Blue filter, pre-exposure 7 minutes.
2nd masking negative: Green filter, pre-exposure 12 minutes; after-exposure 4 minutes: development time 6½ minutes.

Blue plate:
1st masking negative: Orange filter, pre-exposure 7 minutes.
2nd masking negative: Orange filter, pre-exposure 4 minutes; development time 6 minutes.

For development the Agfa-rodinal developer, diluted 1:20, and used at the temperature of 18° centigrade, is employed.

In accordance with the above examples of Section II, two pre-exposures are always made behind two masking negatives for the production of the color separation printing negatives. The process can be extended with success by a third exposure, which is carried out behind the particular masking negative that has been taken with the same colored light as that employed for the after-exposure. In applying this to the example described above for the production of the yellow separation negative, this third additional pre-exposure would, therefore, be made behind the 2nd masking negative with blue light. Accordingly, the additional third pre-exposure for the production of the red separation negative would be made behind the 1st masking negative with green light and in the production of the blue separation negative behind the 3rd masking negative with orange colored light.

The exposure time for the third pre-exposure is longer in this case than the time of the preceding pre-exposures and of the subsequent after-exposures.

The foregoing examples are arranged in accordance with the usual colors of the three-color process, but the process can, of course, be applied in an analogous manner for more than three colors, for example, a fourth color, "black" or "gray", could be used.

The process in accordance with the invention is suited not only for the production of separation negatives for colored reproduction, but can be also used for the production of monochrome negatives or positives.

Etchings, photographs, and similar subjects, which have very soft as well as very heavy tones, could not be photographed hitherto, so that the soft tones and the strong drawing was obtained at the same time. Either the soft tones were successfully held by a short exposure, or the strong drawing by a longer exposure was secured at the expense of the delicate tones.

By pre-exposure with a masking negative, which has the character of a short exposure, the strong drawing can be obtained completely. The pre-exposure is like giving a longer exposure time in one of the preceding examples, whereby the masking negative protects the delicate tones. After removal of the masking negative an after-exposure is made for preserving the delicate tones, which corresponds to one of the brief exposures mentioned in the above examples.

In accordance with this process it is also possible to take views of interiors, and in fact to photograph against the light, without artificial illumination or other aids.

For this purpose a masking negative is produced by means of a slow plate, only a short exposure being given, so that the windows only, i. e., the actual sources of light, are exposed and the plate is developed. The masking negative thus obtained has no drawing apart from the window, the actual light source. Then, behind the masking negative, a highly sensitive orthochromatic plate is pre-exposed; after removal of the masking negative a quite short after-exposure is given to secure the drawing of the window. By these means a negative with complete drawing of the tracery of the lights is obtained with the drawing of the window held, which it hitherto has not been possible to attain.

In corresponding ways, a positive from a hard negative can be produced by this process; such a negative contains on the one hand the strong drawing, and on the other hand produces the strongly covered drawing secured by long exposure.

In the drawing Figs. 1 to 14 schematically represent various stages of the photographic process.

Fig. 1 schematically represents that part of the exposure process in which a masking negative is used. It is assumed in this instance that a black and white photograph will be produced. The object to be photographed is designated by 1, the camera by 2, the objective of the camera by 3, the masking negative by 4, and the light sensitive plate to be exposed by 5. The masking negative 4 is a negative of the object 1. This negative was previously produced by an entirely separate exposure. When the plate 5 is now exposed, through the masking negative 4 the soft tones of the object 1 will be covered because these appear blackened on the negative 4. For this reason without any danger of over exposing the plate 5, the latter may be exposed to the soft tones of the original as long as it is necessary to insure deep recording of the soft tones. After this exposure the masking negative 4 is removed from the camera and the plate 5 exposed for a short period of time. The purpose of this exposure is to record on the plate the fine soft tones which were previously covered by the masking negative. Obviously, the second exposure must be so short as to avoid obliteration by over exposure of the soft tones.

Separation printing negatives for colored processes are produced in substantially the same manner. For the sake of simplicity we assume in Fig. 2 an original composed of three colors, yellow, red and blue. In three successive separate exposures, the three negatives of Figs. 3, 4, and 5 are produced from the original indicated in Fig. 2. These will be the masking negatives.

The first masking negative (Fig. 3) records the red color values of the original. It was exposed through a green filter and the exposure is long enough to insure the covering of the yellow and blue color effects. The negative is developed in the usual manner.

The second masking negative 4 is produced in two steps; a pre-exposure and an after exposure. The plate is pre-exposed behind the first masking negative (Fig. 3) through an orange filter. The purpose of this pre-exposure is to eliminate, i. e., to cover red color effects. During this pre-exposure only red can be covered because in the first masking negative yellow and blue are covered. Upon the termination of the pre-exposure the first negative is removed from the camera in a dark room. Then the plate of Fig. 4 is again exposed in its previous position through a blue filter. The blue filter will expose the blue color tones of the original and blocks the passage of the red and yellow rays. In this manner the second masking negative is produced in which the red rays were covered by exposure through an orange filter and the first masking negative, and blue rays were covered by the secondary exposure through the blue filter. However, as indicated in Fig. 4, the yellow color effects will clearly appear on this negative. The developing proceeds in the usual manner.

The production of the red masking negative (Fig. 5) proceeds also in two stages. First, the unexposed plate is placed behind the masking negative shown in Fig. 3 and exposed through an orange filter. The red color effects will thus be covered. Then the first masking negative is removed from the camera and the second masking negative (Fig. 4) is placed in the camera in front of the plate and the latter exposed through an orange filter in order to cover the yellow part. Therefore, in the red masking negative the red and yellow parts are covered and only the blue appears. The previously described third stage, i. e., exposure of the third negative, is not absolutely necessary.

Figs. 6, 9, and 12 show three separation negatives and Figs. 7, 8, and 10, 11, and 13, 14 illustrate the use of masking negatives in producing the separation negatives of Figs. 6, 9, and 12, respectively. Figs. 7, 8, 10, 11, 13, and 14 appear on the drawing in alignment with the masking negatives 3, 4, and 5 which are used in their production.

Fig. 6 as above stated, shows the yellow separation printing negative. As it appears from Fig. 7, the yellow separation printing negative of Fig. 6 is produced by exposing the panchromatic plate behind the first masking negative of Fig. 1 through an orange filter. The red is thus covered on the yellow separation plate. Then, as shown in Fig. 8, the first masking negative is replaced by the third masking negative and the plate is exposed through a blue filter. Yellow and red are covered by blue rays which may freely penetrate and cover the blue color tones of the original. After a third operation the third masking negative will be removed and the plate exposed through a blue filter so as to bring out clearly the yellow color tones of the original. The soft yellow tones of the original were covered during the pre-exposures behind the second and third masking negatives. Upon the termination of the final exposure, the plate is developed in the usual manner and the yellow separation printing negative of Fig. 6 will be the result.

Fig. 9 indicates the red separation printing negative. It is produced by exposing the panchromatic plate first behind the third masking negative of Fig. 5 (Fig. 10) through a blue filter so as to cover the blue color tones of the original. Then the third masking negative is replaced by the second masking negative of Fig. 4 (Fig. 11) and the plate exposed through a green filter in order to cover the yellow color tones. The yellow will be open and the red and blue will be covered. The third stage of the exposure is through a green filter (after the elimination of the second masking negative) in order to bring out the soft red color tones of the original. In this case also the soft red color tones were covered during the first two exposures through the third and second masking negatives. The plate is developed in the usual manner and the red separation printing negative of Fig. 9 produced.

Fig. 12 shows the blue separation printing negative. This also is produced in three stages of exposure. First, the panchromatic plate is exposed behind the first masking negative through an orange filter (Fig. 13) in order to cover the red colors of the original. Then the first masking negative is replaced by the second masking negative and the plate exposed through an orange filter (Fig. 14) to cover the yellow colors of the original. Thus red and blue will be covered and yellow will be open. Finally, the second masking negative is removed and the plate exposed through an orange filter, in order to obtain the soft blue color tones of the original. The first two pre-exposures through the first and second masking negatives resulted in the covering of the blue color tones of the original. The development follows in the usual manner and the separation negative of Fig. 12 will be obtained.

What I claim is:

1. A process for producing color separation negatives for colored reproductions, characterized by the following steps; producing successively and through differently colored filters a plurality of different masking negatives of an original, each negative during its production being masked by the previously completed negative, exposing the light-sensitive plate in the camera through at least two of said masking negatives in succession and exposing the plate also direct to the original.

2. A process for producing color separation negatives, characterized by the following steps; producing two masking negatives by successively exposing to an original a first masking negative with green light and a second masking negative with orange light, producing a third masking negative by exposing it to the original with orange light, first behind the first and then behind the second masking negative, and then further exposing the third masking negative to orange colored light.

3. A process according to claim 2, characterized by the following additional steps; exposing a panchromatic plate first with orange light behind the first masking negative, then with blue light behind the third masking negative, and finally further exposing said plate with blue light.

4. A process according to claim 2, characterized by the following additional steps; exposing a panchromatic plate behind the third masking negative with blue light, then exposing the plate behind the second masking negative with green light, and finally again exposing the plate with green light.

5. A process according to claim 2, characterized by the following additional steps; exposing a panchromatic plate behind the first masking negative with orange light, then behind the second masking negative with orange light, and finally again exposing the plate with orange light.

6. A process for producing color separation negatives, characterized by the following steps: producing from an original a first masking negative through a green filter, producing a second masking negative by exposing it to said original through the first masking negative and an orange filter and also directly through a blue filter, producing a third masking negative by exposing it to the original through the first masking negative and an orange filter, through the second masking negative and an orange filter, and also directly through an orange filter.

7. A process according to claim 6, characterized by the following additional steps; exposing a panchromatic plate first through the first masking negative and an orange filter, then through the third masking negative and a blue filter and finally directly through a blue filter.

8. A process according to claim 6, characterized by the following additional steps; exposing a panchromatic plate first through the third masking negative and a blue filter, then through the second masking negative and a green filter, and finally directly through a green filter.

9. A process according to claim 6, characterized by the following additional steps; exposing a panchromatic plate first through an orange filter and the first masking negative, then through the second masking negative and an orange filter, and finally directly through an orange filter.

MICHAEL KRONSCHNABL.